United States Patent [19]
Reil et al.

[11] Patent Number: 5,804,129
[45] Date of Patent: Sep. 8, 1998

[54] METHOD AND APPARATUS FOR MANUFACTURING A PACK FOR FLOWABLE CONTENTS

[75] Inventors: Wilhelm Reil, Bensheim; Heiko Bub, Bodenheim; Bernhard Korus, Darmstadt; Gottfried Pusch, Tsungstadt, all of Germany

[73] Assignee: Tetra Laval Holdings & Finance S.A., Pully, Switzerland

[21] Appl. No.: 731,460

[22] Filed: Oct. 15, 1996

Related U.S. Application Data

[60] Continuation of Ser. No. 449,364, May 24, 1995, abandoned, which is a division of Ser. No. 202,076, Feb. 25, 1994, Pat. No. 5,477,974.

[30] Foreign Application Priority Data

Feb. 26, 1993 [DE] Germany .......................... 43 05 913.9

[51] Int. Cl.[6] .................................................... B29C 51/08
[52] U.S. Cl. .......................... 264/545; 264/157; 264/296; 264/297.8; 156/292; 425/388
[58] Field of Search .................................... 264/545, 527, 264/157, 296, 297.8; 156/292; 425/388

[56] References Cited

U.S. PATENT DOCUMENTS

| | | |
|---|---|---|
| 2,918,698 | 12/1959 | Hagen . |
| 2,991,500 | 7/1961 | Hagen . |
| 3,082,927 | 3/1963 | Winstead . |
| 3,478,912 | 11/1969 | Seiler . |
| 3,491,907 | 1/1970 | Eelkema . |
| 3,548,043 | 12/1970 | Held ........................................ 264/545 |
| 3,837,517 | 9/1974 | Held, Jr. . |
| 4,241,843 | 12/1980 | Walker et al. . |
| 4,696,636 | 9/1987 | Evely . |
| 4,804,083 | 2/1989 | Weeks . |
| 4,848,601 | 7/1989 | Reil ........................................ 222/528 |
| 4,890,757 | 1/1990 | Robbins, III . |
| 5,058,772 | 10/1991 | Moore et al. .......................... 222/109 |
| 5,158,209 | 10/1992 | Reil et al. .............................. 222/129 |
| 5,191,988 | 3/1993 | Reil et al. . |

FOREIGN PATENT DOCUMENTS

| | | |
|---|---|---|
| 2 29 260 | 11/1986 | European Pat. Off. . |
| 04 28 891 | 10/1990 | European Pat. Off. . |
| 1265926 | 5/1961 | France . |
| 19 55 857 | 2/1967 | Germany . |
| 70 17 988 | 3/1970 | Germany . |
| 71 41 805 | 11/1971 | Germany . |
| 22 12 783 | 3/1972 | Germany . |
| 31 26 671 | 3/1982 | Germany . |
| 82 30 246 | 12/1982 | Germany . |
| 35 10 618 | 3/1985 | Germany . |
| 90 02 211 | 6/1990 | Germany . |
| 36 43 030 | 1/1991 | Germany . |
| 40 35 517 | 5/1991 | Germany . |
| 39 39 970 | 6/1991 | Germany . |
| 11 29 877 | 10/1968 | United Kingdom . |

OTHER PUBLICATIONS

English language abstract of DE 36 43 030 C2.
English language abstract of DE 40 35 517 A1.
English language abstract of DE 39 39 970 A1.
English language abstract of DE 35 10 618 A1.
English language abstract of DE 31 26 671 A1.
English language abstract of DE 82 30 246 U1.
English language abstract of EP 2 29 260 A2.
English language abstract of EP 04 28 891 A2.

*Primary Examiner*—Jan H. Silbaugh
*Assistant Examiner*—Edmund H. Lee
*Attorney, Agent, or Firm*—Burns, Doane, Swecker & Mathis, L.L.P.

[57] ABSTRACT

A method and apparatus for manufacturing a pack for flowable contents in a deep draw process having tubular side walls, a bottom and a top. The top has a pouring opening having an upstanding collar and a seam that passes around the pack in a plane that is oriented in the top so that the plane is interrupted by the pouring opening and projects on diametrically oppositely disposed sides almost as far as a free upper edge of the collar. The collar is formed of two collar halves joined together at the seam, and threads are provided on the collar for a screw top. An annular fitting sealing surface is provided on the free upper edge of the collar

10 Claims, 10 Drawing Sheets

METHOD AND APPARATUS FOR MANUFACTURING A PACK FOR FLOWABLE CONTENTS

This application is a continuation of application Ser. No. 08/449,364, filed May 24, 1995, now abandoned, which was a divisional of application Ser. No. 08/202,076, filed Feb. 25, 1994, now U.S. Pat. No. 5,477,974.

FIELD OF THE INVENTION

The invention relates to a pack for flowable contents, having tubular side walls, a bottom and a top wall which are all made of a deep-drawable plastics material, wherein the top wall has a pouring opening which can be closed by a top and which has an upstanding collar, and a seam which passes around the pack in a plane parallel to the longitudinal central axis is arranged in the top in such a way that it is interrupted by the pouring opening and projects on diametrally oppositely disposed sides almost as far as the free upper edge of the collar.

The invention also relates to a method for manufacturing a pack for liquids which has similar features and to a device for deep-drawing half-shells from a plastics panel.

BACKGROUND AND SUMMARY

Packs are known of the kind mentioned in the introduction which are manufactured from inexpensive plastics material by deep-drawing processes, with little waste, which are good to stack and which are properly sealed to liquid. For filling and emptying purposes, the top of the known pack has a hole which is closed by the afore-mentioned upstanding collar, and a pouring opening, composed of two parts, is placed into and fixed inside the collar by means of hot melts or the like or by sealing methods. The top of the pouring device which can be closed and opened can be lifted up from the bottom part, and an opening is thereby made in the bottom part through which the contents can be emptied.

Sealing problems have occurred when manufacturing the hole with the upstanding collar due to the material becoming deformed at the outermost upper edge of the collar, on the one hand, and in the region of the seam, on the other hand, and it was seen that the walls of the collar had not completely formed during the deep-drawing process. If a pouring device is then sealed in, with many packs, the sealing can be corrected. However, when used without undue cares the claims made upon the pack can cause individual pouring openings to become loosened from the collar, so that leakage will occur.

Consideration has also been given to improving devices for structuring the collar, particularly if the pack is formed from two half shells which are welded together by way of the afore-mentioned seam to form a pack which is only open at the hole. Therein, it has been seen that the heating plate in the region of the recess did not make enough heating contact with the plastics panel to be heated and deep-drawn, particularly in the region of the recess where deformation in the neck region had to occur. The problem of a lack of heat caused non-uniform stretching of the material.

Therefore, with an improved device, a mould part which could move in various positions was arranged in a companion pressure plate facing the deep-drawing tool, in a chamber behind an opening in the surface, and the mould part which was able to retract so that is was flush behind the contact surface of the companion pressure plate and projected in a second sealing position into a recess at the edge of the deep-drawing tool. This meant that the plastics panel which had to be heated could be brought into a substantially better heating contact, so that the above-mentioned heating problems with the defective stretching were prevented. However, these manufacturing tools were complex structures which could be improved to make more cost-effective manufacture possible.

Therefore, the aim of the invention is to create a pack of the kind mentioned in the introduction and which is manufactured by employing methods mentioned in the introduction, in such a way that the pack can be easily opened as a manufactured product, closed in seal-tight manner and manufactured economically.

This problem is solved according to the invention in that the collar is composed of two collar halves which are joined at the seam, on which collar threading means are provided for the purpose of screwing onto the pack a screw top with a corresponding screwthread and sealing surface, and that arranged on the free upper edge of the collar is an annular, fitting sealing surface. The new aspect of the pack according to the invention is the screw closure means. When tests were being carried cut, the consumer's plea was frequently voiced to be able to close a pack with a screw top and to then be able to open it to empty it. Screwing on a top is one possible way of closing the pack which is easy to cope with for the end user, especially since proper sealing is provided by a screw on top because it is possible for the consumer to detect the clamping action.

Admittedly, containers with an upstanding collar and screwthread, on the one hand, and with a screw top, on the other hand, are known per se. Usually, however, these are different types of packs, but not those with the features mentioned in the introduction, in particular having a seam which passes around the pack and which projects almost as far as the free upper edge of the collar. The inventor has taken the unexpected step of arranging threading means on the collar, in spite of the seam, in such a way that he can thus screw on a screw top with a corresponding screwthread. At the same time, a sealing face is provided in the screw top which fits a sealing face on the free upper edge of the collar. Usually, the collar is annular in the plan view, and, in particular, it can be circular, so that, the sealing faces are circular on the collar and screw top.

With one preferred embodiment, the screwthread is arranged in the collar according to the invention. The skilled person knows that during the deep-drawing process it is possible to shape really complex structures. With known workpieces the screwthread used to be provided by deep-drawing processes. This technique has been used by the inventor to arrange half the screwthread in each half of the collar, so to speak, the one half naturally being of a configuration which suitably fits the other half of the thread in the other half of the collar. It is a question of providing the thread as a whole as a continuous projection of the threads of the screw thread, so that the screw top can be properly screwed on.

With another design of the invention it is provided that the thread is formed by the seam. The seam not only projects outside at least some surfaces of the pack to varying vertical extents, but it projects from the collar, which, in the case of the particular embodiment under consideration here, can be smooth, thus without a screwthread. The screwthread is then completely taken care of by the seam. To this end, the edge of the seam on the collar which projects radially outwardly from the pouring opening is profiled in such a way that the screwthread pitch of the screw top can engage in this profile as if a screwthread were placed opposite—namely on the collar—, despite the fact that the collar is smooth. On two diametrally oppositely disposed sides of the collar, the seam reaches as far as the upper edge of the collar, and if these two profiled seam portions on the collar which are diametrally oppositely disposed to each other are profiled appropriately, sufficient holding force is provided for the screw top which is placed on the pack, so that the screw top can be turned in the desired way axially down onto the collar in such a way that the scaling face is placed on a sealing face, and a sufficient pressure is provided for the desired sealing.

It is also possible to imagine a combination of the two afore-mentioned alternative solutions, namely that apart from the screwthread in the collar the appropriate profiling acts in the seam as a screwthread, so that a companion thread is provided on at least the major part of the periphery, preferably over the entire periphery, of the collar.

In the latter case, or in the case of the screwthread which has been taken care of by the seam, the screwthread is an outer thread. However, the invention is in no way limited to such a variant.

Tests and new shapes have resulted in a pack being able to be structured which is characterised, according to the invention, in that the thread in the collar on the pouring opening is preferably an inner thread which is closed all around, and the screw top is externally of a U-shaped cross-section with the "U" shape being open towards the top, and is provided on its scaling face with a sealing mass. With this embodiment, one is free of the problems of the seam. This has to be formed relatively easily both on the pack and also on the deep drawing tool, and, in the case of a joined pack, represents an inner thread which is closed all around. A screw top could be designed at the top, so that gripping tabs, straps, or radially placed transverse walls ensure that the lid is screwed into the inner thread of the collar. However, since the consumer likes to be able to hold the screw top from the outside, in order to therefore screw it on and unscrew it consistently and more easily in the usual way, the outsides of the screw top, or the region around its periphery, are of "U"-shaped cross-section, as disclosed hereinabove. A sealing mass can be placed into a frustoconical surface or a groove which is formed by the "U" shape at the periphery of the screw top, so that after the screw top has been screwed on and tightened the one sealing face sits properly and firmly on the other, and the pack is sealed in the desired way.

Whilst blow-moulding techniques can produce other types of packs with screw closure means and can provide them more easily with tight closure means, the sealing means of the closure means according to the invention is a deep-drawn product with generally thinner walls. Due to the "U"-shaped design of the screw top on the outside, the inner thread on the collar which is closed all around on the inside, and due to the sealing face on the collar and the sealing mass in the screw top, when the top is screwed on, a stable companion face is created, so that the top can be screwed on and unscrewed without any problems. Even if the pack is designed in a special way from the two shell-shaped halves with the seam projecting all the way around, which advantageously reinforces the pack, on the one hand, but wherein very small gaps should be present in the region of the collar, on the other hand, then no unsealed regions are to be feared, since they are compensated for by the elastic sealing mass. When the top is screwed on, the sealing mass, which may be rubber, for example, is placed on the sealing face on the upper edge of the collar, and the sealing mass then penetrates into tiny channels which may be present in the region or the seam, and provides sealing there in the proper way.

In this respect, it is helpful, if, according to the invention, the sealing face of the collar and that of the screw top are frustoconical in design. Maximum utilization Is then made of the sealing forces because when the top is screwed down into the collar, all axial compressive forces and tensional forces are responsible for sealing, as well as the radial forces occurring.

Another alternative solution is, however, the outer thread which has been mentioned beforehand in connection with the seam, wherein, in this case, the pack is characterised in that the screwthread is an external thread on the collar adjacent to the pouring opening, and the sealing surface is circular and extends from the outer free edge of the collar to the centre of the opening. The seam, which does not make sense, on the outside of the collar can be overcome by appropriate profiling of the outer edge of the seam in the region of the collar, as mentioned hereinabove. In this way, and possibly with the help of further measures to be described hereinafter, the collar of the pack according to the invention can be provided, contrary to expectation, with an outer thread. The arrangement of an outer thread is advantageous with respect to the sealing surface because this latter can be placed inwardly towards the centre of the opening, to a certain extent reducing the size of the pouring opening disposed inside the collar; whereas with the afore-mentioned variant with the internal thread the sealing surface preferably extended outwardly and inclinedly, so that in the case of the internal thread the pouring opening widened outwardly at the top. The words, "towards the centre of the opening" mean that in the direction of the circular sealing surface between the outer thread the circular surface begins at the outer free edge of the collar and extends radially over the entire periphery a little way towards the centre, namely to a width equal to the circular surface. The circular pouring opening is slightly reduced in size because of this circular sealing surface. When speaking of the "radial width" of the sealing surface in connection with the radial extent of the circular sealing surface, this "radial width" is equal to at least 1 mm, preferably 2 to 3 mm, with a preferred embodiment.

It is also preferable according to the invention if a weldable covering film is sealed to the circular sealing surface to provide a barrier to light and/or gas. It will be appreciated that the plastics material of the covering film must be able to be welded or sealed to that of the sealing surface and therefore that of the collar. The wall thickness of the pack and also of the collar is thicker, whilst the weldable covering film can be a plastics layer which is thinner by at least one magnitude. Obviously, it is only possible to seal the covering film with an embodiment which has an outer thread. Otherwise, it would not be possible to close the screw top, without breaking the film. With the embodiment which has the outer thread, the covering film can therefore show that the pack has not been tampered with. In addition, it can ensure that the pack is sealed, wherein the sealing requirements could then be shifted from the sealing surfaces between the screw top and edge of the collar.

By appropriately mixing the plastics material or by laminating a plurality of materials it is possible to also use the covering film as a barrier to prevent gas from entering or escaping, and also to provide a protection to light.

With the embodiment of the pack which has an outer thread on the collar it is particularly preferable, if, according to the invention, the collar at the pouring opening is flattened inwardly in the region of the seam on diametrally oppositely disposed sides, in such a way that a flat collar portion is provided without any screwthread on both sides of the seam, and that the outer edge of the seam does not project beyond the round profile of the collar. By laterally flattening the collar in this way, all the problems relating to the interference of the external thread by the seam are surprisingly eliminated. The afore-described embodiments where the seam edge is structured by appropriate profiling can be abandoned, e.g. if the tools are simplified thereby. Nothing needs to be changed with respect to the basic structure of the pack, i.e. the seam extends from the side wall and over the top wall as far as the collar which projects from the top wall and up on this at least almost as far as the top edge. If the seam extends all the way to the upper edge, this does not have any adverse effects, nor does it pose any problems. It is true that due to the fact that the collar is flattened laterally in the region of the seam a small portion is created on the collar which does not have a screwthread. However, it has been shown that this is not harmful since over all the rest of the part of the periphery the screwthread of the collar applies a sufficiently strong pull on the screw top and thus the sealing surfaces. It is obvious to the skilled person that if the collar is laterally flattened, the outer thread on the collar Is selected to be large enough to allow the seam to remain enclosed or embraced by the outer thread. If necessary, the flattened region can be structured so that it is of lesser depth by cutting off the seam, i.e. by reducing the height by which it projects from the collar radially outwardly. When these features are present, the embodiment described here has the afore-mentioned features so that the outer edge of the seam in the region of the collar can be cut out with a profile or with recesses so that the seam represents another supporting location for the screwthread of the screw top.

In combination with the embodiment which has the outer screwthread, it is thus favourable, if, according to the invention, the seam which projects from the collar is cut out in profile as A continuation of the outer thread.

Both for the alternative solution with the inner thread and also for that with the outer thread, it is advantageous according to the invention if the screwthread has at least two threads. The skilled person knows that when the screwthread has two threads it is one where at least two screwthreaded portions partly overlap each other. If, for example, the screwthread has four threads, then four screwthreaded portions are provided, each of which extends along the periphery by more than 90°. This means that the screwthreaded portions overlap, despite being separate. As a result, when the top is screwed on, it is held to the collar all the way around. The screwed on top is then tightened with sufficient force on the collar of the pack along the entire 350° periphery.

It is also advantageous if the screwthread is designed as a round screwthread because this means that the tool shapes can easily be separated from the workpiece or that the deep-drawn product can be removed from the mould. By designing the screwthread as a round screwthread, the deep-drawn material can be more easily deformed and better adapted to suit the companion parts. The tolerances of the screwthread on the collar and screw top can then be selected so that they are greater. It has also been seen that a screwthread of this type is more stable. During the screwing operation, as known, closure forces must be produced which are better received by a round screwthread. In order to obtain the correct closure forces, the pitch of the screwthread is also structured accordingly. Also, it is expedient if the screwthread is of a size such that the afore-mentioned covering film can press into the pitches of the screwthread when the top is being screwed on, without causing the slightest breakage. With respect to tolerances. It is provided that the screwthread has a clearance of about $1/10$ mm relative to the collar of the pack.

With another advantageous embodiment of the invention, the annular sealing surface at the top edge of the collar tapers in a substantially conical configuration into an almost sharp edge. In other words, the material strength of the annular sealing surface becomes reduced radially from the outside to the inside, i.e. from the top outer edge of the collar inwardly towards the centre, where the almost sharp edge is disposed. Therein, it is advantageous if the annular sealing surface at the top edge of the collar tapers in a substantially conical configuration into an almost sharp edge. If, for example, a vertical longitudinal central line is imagined through the centre of the pouring opening, and if a plane which extends transversely to the pouring opening is placed through the pouring opening, the inclination of the annular sealing surface can be about $-10°$, wherein with the other embodiments other dimensions are clearly possible. Therein, it can be advantageous, if, with one particular embodiment of a screw top its corresponding sealing surface is likewise slightly frustoconical with the corresponding inclination of $-10°$ to the inside of the pack.

The fact that the material is made thin promotes fixture of the covering film to the circular sealing surface.

Major manufacture-related advantages also result from the sealing surface which tapers inwardly in a substantially conical configuration, as will be described best in conjunction with the method hereinafter.

The method serves to manufacture a pack for flowable contents, having tubular side walls, a bottom and a top wall which are all made of a deep-drawable plastics material, wherein the top wall has a pouring opening which can be closed with a top and with an upstanding collar, and a seam which passes around the pack in a plane parallel to the longitudinal central axis is arranged in the bottom in such a way that it is interrupted by the pouring opening and projects on diametrally oppositely disposed sides almost as far as the free, upper edge of the collar.

Packs of this kind are manufactured by deep-drawing from a panel-shaped plastics blank in such a way that two shells which are open on one side, e.g. half shells. are deep-drawn and are arranged in such a way that their outer edges which extend all around are oppositely disposed, welded together and joined in such a way that a hollow pack for flowable contents is produced. For filling and closing, a neck region has been formed on the edge of each plastics half shell with a semi-cylindrical casing-like collar, in such a way that after the two half shells are joined, the afore-mentioned closable pouring opening in the top is produced.

As already described hereinabove in connection with a known pack, the formation of the opening in the neck region at the edge of the plastics halt shell gave rise to heating problems with the resultant problem of there sometimes being insufficient heat in some places. Therein, each half-shell ends in the neck region. Therefore, the opening in the neck region is therefore on the edge of the plastics half-shell (as the product). The edge of the plastics half-shell as a whole is closed all around, but is disposed outside the neck region only in a plane. In the neck region, along the opening, the edge passes in the form of an arcuate surface out of the afore-mentioned plane and back into that plane. The formation of the opening meant that there was insufficient heat. During the deep-drawing operation, the material would unfortunately begin to migrate and cause deformation to the neck region, particularly to the upstanding collar at the pouring opening in the top of the subsequent pack. Over-heating the respective plastics half shell in the region of the opening and also additional rubber sealing with the known method have still not eliminated the problems encountered in a sufficiently complete and far-reaching manner, and so there is a need for further improvements to be made to the method and for it to be simplified.

To solve the problem mentioned in the introduction, particularly with respect to more economical manufacturing and a simpler manufacturing method, a proposal is therefore made according to the invention for the method to be such that from the flat, deep-drawable plastics part at least one pair of half-shells is simultaneously deep-drawn which are joined to each other in the centre by way of a semi-cylindrical connecting channel, wherein a half-shell shaped pack portion is formed inside the closed seam which passes around the pack and which is disposed in a common plane, which pack portion, after the deep-drawing operation, is joined to a second one by joining the seam to form at least one pair of packs, whereupon a separation is made in the centre of the cylindrical connecting passage to form at least one pack which is open on one side and which has a collar. According to the new method of manufacture, the half-shells are deep-drawn, being arranged in a specific position relative to each other; namely in such a way that they are joined together by way of a semi-cylindrical passage, wherein this passage is preferably less in diameter than the main body of the shell. In other words, the cross-sectional surface of the main body of the half-shell has a larger surface area than that of the semi-cylindrical connecting passage. Then when the separation operation subsequently takes place according to the invention of a pair of half-shells, a collar results on the pack, in the centre of the cylindrical connecting passage—or, in the case of the semi-cylindrical passage, half a collar. After the pair of half-shells has been deep-drawn with the two outwardly disposed main bodies of greater volume and the connecting passage of smaller volume disposed therebetween, this first pair of half-shells is joined to a second pair of half shells, which has been made accordingly, to form a pair of packs. If a plurality of pairs of half-shells is deep-drawn simultaneously, then in this way a plurality of packs is formed, wherein the seam is disposed in the afore-described plane and extends over the region of two collars. This pair of packs which rest on each other, opening to opening, or collar to collar, so to speak, or a corresponding plurality of pairs of packs are then separated in the way described in the centre of the cylindrical connecting passage. After separating, e.g. after a sawing or cutting process, two packs which are open on one side result from the pair of packs which are initially integrally formed.

Therein, it is particularly preferable, if, according to the invention, the half-shell-shaped pack parts are joined to form a pair of packs by the residual heat still present from the deep-drawing process.

To manufacture a pack for flowable contents, having tubular side walls, a bottom and top wall which are all made of a deep drawable plastics material, wherein the top wall has a pouring opening which can be closed with a top and which has an upstanding collar, and a seam which passes around the pack in a plane which is parallel to the longitudinal centre axis is arranged in the top in such a way that it is interrupted by the pouring opening and projects on diametrally oppositely disposed sides almost as far as the free, upper edge of the collar, it is further provided for the method that from the flat, deep-drawable plastics part at least one pair of half-shells is simultaneously deep-drawn i.e. two half-shells simultaneously in position relative to each other in such a way that the collars are oppositely disposed to each other and a half-shell pack portion is formed inside the circularly extending, closed seam which lies in a common plane, the half-shell pack portion being joined, after deep-drawing, to a second one by joining the seam by virtue of the residual heat still present from the deep-drawing process to form at lease one pair of packs, whereupon a division is made between the collars to form at least one pack which is open on one side.

One of the advantages obtained by way of this method consists in the favourable waste-free method of manufacturing a pack of the afore-described kind which has the peripheral seam. The second, and main, advantage consists in the possibility of manufacturing a pack simply with an opening, without any problems occurring in the region of the opening or without any of the afore-described problems being encountered which occurred with known methods. The new method admittedly uses deep-drawn half-shells which are later joined together, but unlike with known methods there is the major advantage that an edge is provided around the outside of the deep-drawn half-shell, and it can remain until the two half shells are welded together, without a recess having to remain for an opening in the top of the subsequent pack, and having to be sealed with special, partly complex means. The edging which runs around the edge of the shell-like deep-drawn product during the deep-drawing process and afterwards during welding is disposed in one plane and therefore offers optimum conditions for handling. This major advantage is obtained by virtue of the fact that each half shell has two individual half shells simultaneously in a specific position relative to each other. This position is the afore-described position where the collars of the product, i.e. of the pack, are oppositely disposed to each other. Since the collars enclose the opening of the finished product, i.e. of the pack, the position during the course of the deep-drawing process can be compared to the life-saving "mouth-to-mouth" resuscitation position, in other words, the packs are deep-drawn in such a position that opening is disposed opposite opening.

Each half-shell is deep-drawn. The subsequent end product, i.e. the pack, is composed of two half shells, as described. The afore-mentioned and new position of the individual half shells is, however, that of opening towards opening. If one side is considered, i.e. a complete half shell which is embraced in closed manner by the desired flat edge, then it is obtained by way of the new, afore-described arrangement of opening against opening with the semi-cylindrical collar of the one individual half shell being placed directly on the semi-cylindrical collar of the other single half shell which both together form one complete half shell which can be shaped in one step by a deep-drawing process. It will be appreciated that the process can easily be multiplied if a rectangular plastics panel which is of suitable size and perhaps elongate is taken, from which not only one half-shell is shaped by a deep-drawing process but a plurality—possibly ten simultaneously—half shells. The one half shell, or the plurality of half shells, can then be shaped in a deep-drawing machine on the one side of a symmetrical structure, and simultaneously the same product can be shaped on the other side by deep-drawing techniques, so that both half shells or the plurality of half shells are produced simultaneously, and by using the residual heat still present from the deep-drawing process, seam is placed on seam, and welding is used to join the overall structure into one which is closed completely all the way around.

When simultaneous deep-drawing of a pair of "half shells" is spoken of in connection with the solution according to the invention, it is the half shell on one side of the tool which is meant. This is the half shell which is deep-drawn from a flat panel-shaped plastics piece or blank. The fact that on the one side of the machine a plurality of e.g. eight or twelve complete half shells is produced simultaneously by deep-drawing techniques, as opposed to one complete half shell, is not inconsistent with this. The "half shell" which is mentioned in the solution according to the invention is an individual half shell which represents the one half or the later pack after it has been removed from the mould. The complete half shell is formed by a pair of individual half shells. Thus, when speaking of deep-drawing a "pair of half shells" in a specific position, it is assumed that after removal from the could the halves of two subsequent packs are deep-drawn. "At least" one pair of half shells means that at least one complete half shell is deep-drawn, but that eight, ten, twelve or another number of complete half shells can be manufactured simultaneously on one side of the deep-drawing tool. To simplify the solution, the following description will refer to a pair of half shells. In other words, there are two individual half shells, collar to collar. This is the case on the one side of the machine, and likewise on the oppositely disposed side of the machine since only be joining the deep-drawn half-shells is it possible to form the closed space by welding with two packs joined together.

We are therefore dealing with a pair of half-shells, i.e. two individual half shells which are placed together, collar to collar and which form one overall half shell. The invention teaches that a pair of half shells—in other words, one complete half shell—is deep-drawn in such a way that the pair has a closed edge which runs around the outside and which becomes the subsequent seam of the pack.

After the pair of half shells which has now been clearly described has been removed from the mould, it will be appreciated that by placing two pairs of half shells edge to edge, or seam to seam, and by pressing the edges together, the weld seam of the subsequent pack is produced, and so a pair of Packs is simultaneously formed as a unit. The unit is closed outwardly.

So that from this unit, formed by deep-drawing and welding, it is possible to make a pair of packs, after the join is made in the seam region a separation is made "between the collars". The separation is carried out expediently only directly before the individual pack is filled. Only on separation does the outwardly closed unit of the pair of packs become one—and another adjacent—pack which is open on one side.

It has been shown that in this way it is surprisingly easy to arrange a screwthread in the collar. By virtue of the new method of deep-drawing pairs of half-shells, the former critical region with the pouring opening is no longer outside on the edge of the deep-drawn product, but is in the middle. The holding forces for the deep-drawing process are completely shifted outwardly into the edge which is closed all around, and therefore undestroyed on the outside. In this way, a container is obtained which can be produced using conventional known deep-drawing techniques, despite the fact that packs formed from two, half shells are produced with pouring openings which are almost arbitrarily structured and which have an upstanding collar. This Is because according to the invention an outwardly closed intermediate product, a hollow outwardly closed body is formed which is preferably only separated directly before the filling operation in such a way that the two individual packs are produced. Therefore, the inside of the individual pack remains clean to a large extent. It will be appreciated that in addition to the collar some parts can be stamped from the flat or smooth seam. It will also be appreciated that it is possible to arrange both an outer thread and an inner thread in the collar or in regions an the collar. It is also possible to arrange a sealing surface at the top free edge of the collar, without any problems.

In this connection it is particularly advantageous, if, according to the invention, the frustoconical sealing surface projects outwardly from the pack between the collars, after the blank has been separated, and—preferably after being filled—is shaped into a frustum which projects into the inside of the pack. As mentioned in the introduction to the description, if an imaginary longitudinal central line is imagined which projects vertically from the top out of the pouring opening, then the frustum shape of the sealing surface before separation can have a cross-sectional shape such that the frustum widens downwardly to the inside of the pack. In other words, in cross-section, the edge of a frustoconical sealing face of this kind is disposed at an angle of e.g. $+10°$ at the top towards the longitudinal central line under consideration. This is the condition after the pair of half-shells, in other words the two individual half shells or the one complete half shell have been finished. Then, after joining, a pair of packs is produced whose collars are placed upon one another, with the sealing face against sealing face and with the collar against collar. The total area occupied by two pairs of packs is then separated, end for this reason after separating the blank from the one pair of packs as a unit two separate packs which are open on one side are produced. With these packs, after separation, the frustoconical sealing face is disposed high up on the outside of the pack. It is also expedient, if, in the afore-described way, this sealing surface is later moulded inside the pack, so that when viewed in cross-section the edge of the sealing face is set at the bottom and inwardly at an angle of e.g. about $-10°$ relative to the longitudinal centre axis.

Therein, it is preferable, if, according to the invention, the free upper edge of the pack which is open on one side is smoothed along the dividing line by the effects of heat. Additional heat is supplied separately by a tool, e.g. by a hot moulding die. The moulding die can be used to smooth the free upper edge, whether the sealing face is shaped or not, whether it is frustoconical or disposed in one plane, or whether the tip of the frustum is oriented inwardly or outwardly.

It is also preferable to additionally seal to the annular sealing face of the upper edge a separate film, and the aforementioned smoothing operation may be carried out directly by sealing the film to the sealing face. It is also possible to seal the film to the sealing face in this condition when it is frustoconical, and tapers upwardly and outwardly, with the edge thus being placed against the longitudinal centre line at $+10°$ in cross-section. It has been seen that during the sealing of the separate covering film to the sealing surface, or by way of that operation, the annular sealing surface which tapers outwardly is folded inwardly and down, resulting in the inclination of the edge, as viewed in cross-section, being moulded from the position of $+10°$ into the position of $-10°$.

The sealing, carried out in this way, of the pouring opening of the pack is simultaneously a guarantee to the end user that the pack has not been tampered with, because before the pack is emptied for the first time the foil has to be torn. In this respect it is expedient if the covering film projects at least at one corner of the pouring opening, giving rise to a gripping tab, so to speak.

The apparatus for deep-drawing half-shells from a plastics panel is characterised, according to the invention, in that two mould halves which are of mirror-image configuration are each designed with a collar portion in such a way that the mould halves on the collar portions are oppositely disposed to each other, and that the two mould halves with the collar portions are joined by way of a common raised edge which is of a V-shaped cross-section in the region of the collar portions. In a similar way to that mentioned hereinabove in connection with the method for the pair of half-shells, the deep-drawing tool, i.e. the device according to the invention, has two mould halves, or, in other words, a pair of mould halves. These two mould halves form a unit. They are embraced, on the one hand, outwardly by a substantially flat seam region, and, on the other hand, they have the two afore-mentioned juxtaposed collar portions in the central region. This gives rise to two mould halves of mirror-image configuration or which are arranged in mirror-image relationship, a head on head, so to speak, with the base portions being disposed outwardly apart. These mould halves are individual mould halves, which have one common raised edge in the centre, in relation to which the one individual mould half is designed in mirror-image manner relative to the other. Altogether, the unit of the complete mould halves forms a deep-drawing tool with an outwardly continuous edge which is disposed substantially in one plane. The collar portions are disposed inside that edge, e.g. in a central region of the pair of mould halves. The raised edge between the two collar portions is disposed almost entirely in the semi-cylindrical recess of the collar portion. This does not in any way adversely affect another variant according to the invention in which a thread which has at least two threads is arranged in the respective collar portion.

If a view is taken of the edge which is V-shaped in cross-section from the top vertically into the cavity of the unit with the two mould halves, then the sharp edge of the "V" is to be seen, i.e. the "V" opens away from the observer, downwardly or towards the outer wall of the mould.

The deep-drawing device should preferably be designed with further features with specific embodiments in such a way that the pack described in the introduction can be produced, or so that the above-described method can be carried out with this device. These are particularly preferable embodiments of the deep-drawing device.

Independently of this combination of features, however, according to the invention it is also advantageous if provided in the prolongation of the V-shaped raised edge of the deep-drawing device, in the respective edge portion which is adjacent to the collar portion is a wide extending groove which is approximately 1 mm in width and which is raised, which groove is common to two oppositely disposed mould halves. This groove which extends all around and which is box-like or which is U-shaped in cross-section advantageously serves to produce a region of reduced thickness in the region of the subsequent weld seam or in the edge region of the deep-drawing mould outside the collar where the afore-mentioned raised edge is provided. This considerably simplifies the separation operation. By way of example, the dividing tool can be guided through the seam of reduced thickness between the collars of the ready product, and by virtue of the smaller thickness of material the separating operation itself is facilitated. The accuracy of the separating operation is promoted thereby.

It is also advantageous according to the invention, if, in the region of the raised edge of V-shaped cross-section at least one approximately needle-shaped region of increased height Is provided which projects inwardly. The material is placed on this during the deep-drawing process in such a way that a hole the size of a needlepoint is produced in the and product. This creates a ventilation possibility for the closed internal space of two mould halves which are joined along the weld seams. The deep-drawing and weld tools heat not only the wall of the deep-drawing pack, but also tho air disposed within them. Understandably, this cools after the manufacturing process, and decreases in volume. So that the pack does not collapse when the air enclosed cools, ventilation is provided by way of the needlepoint hole on the outer upper edge of the respective collar of the separated pack. The diameter of the hole obtained by the needle-shaped region of increased height is in the range of 1/10 mm with a preferred embodiment, and the diameter of the hole is preferably 1/10 to 9/10 mm. The hole is not destroyed when sealing is provided by the sealing surface.

According to the invention, a device is also provided with means for guiding together in undistorted and parallel manner two mould halves and for guiding together each of the edge portions which are closed all around of the mould halves of mirror-image configuration for the half shells disposed inside them to be welded together. These devices which hold the mould parts can be designed to be movable in rotational manner or with translatory movement, and the movement paths of the holding device can also contain translatory and rotational movements in combination, provided that the two mould halves can be guided together properly in such a way that after the two mould halves have been guided together, they are parallel to each other, and the seam is disposed on the seam. In this way, the half-shells which are disposed in the mould halves can be guided together in such a way that the edge portions which are closed all around but which are still warm from the residual heat of the deep-drawing operation are placed on each other and are pressed together as a result of the welding process. Thus, two packs are formed from the half-shell on the one side of the machine which is joined to the half shell on the other side of the machine, which packs are closed on the outside—up to the needlepoint hole, before separation is carried out. The half-shells are therefore produced with this tool by deep-drawing, and are then welded together. After they have been removed from the mould, the afore-described inwardly hollow and outwardly substantially closed body of the unit of the two packs with head disposed on head and mouth disposed on mouth result, which are separated before being filled.

With the embodiment which has the sealing film, since it is very easy to provide a guarantee that the pack has not been tampered with, this is also possible with other embodiments by way of the tops. Before the top is placed on the pack, or before the screw top is screwed on, the tops are stored in a roll. Each top is pulled from the roll, cut off and then arranged on the collar of the top wall. Between two tops on the roll there is a connection piece. If the connection piece is then cut off from a top, and allowed to hang from the other top, then that connection piece is used as a weld vane and after the top has been arranged on the pouring opening or the collar of the pack can be stuck to the wall next to it. The top of the pack according to the invention cannot be removed without tearing off and loosening this adhesive vane. This is a practical way of providing a guarantee that the pack has not been tampered with.

BRIEF DESCRIPTION OF THE DRAWINGS

Further advantages, features and possible applications of the present invention will emerge from the following description of preferred embodiments, given in conjunction with the accompanying drawings, wherein.

DETAILED DESCRIPTION

Figure 1:
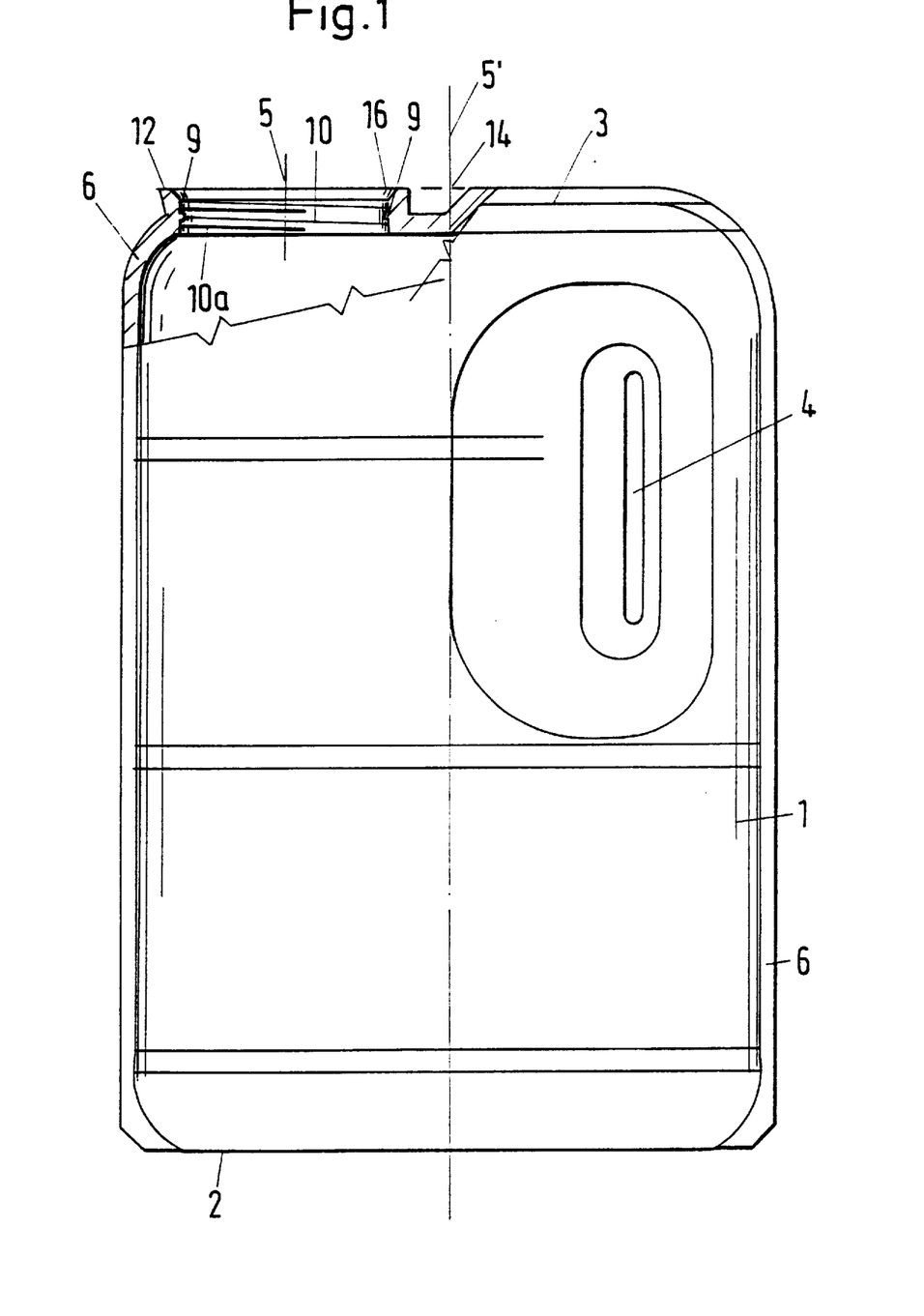
FIG. 1 is a side view of a pack with an upstanding collar at the pouring opening and the seam which passes around the outside of the pack, wherein the collar is provided with an internal thread.

FIG. 1 shows a side view of a first pack for liquids which has tubular side walls 1, a bottom 2 and a top wall 3. Reinforcing beads which are not marked in greater detail and which extend horizontally in FIG. 1 run at uniform spacings apart around the side wall 1, and in the top rear region of that side wall there is a handle mould 4. Disposed in a plane which is parallel to the longitudinal centre axis 5 running parallel to the longitudinal axis 5' of the pack as a whole is a seam 6, also termed a weld seam, which embraces the pack and which divides it into two halves, as can be seen clearly in the embodiments shown in FIGS. 3 and 5. The seam 6 passes through the bottom 2 along a recess 7, so that viewed as a whole the bottom 2 is basically flat and the set-down surface of the respective pack is formed predominantly by flat part surfaces, without harming the projecting seam 6. In the top 3, the seam 6 is interrupted by a pouring opening 8 which has upstanding collar 9 on the outside. Its wall thickness can be seen particularly clearly in FIG. 2, in the right-hand broken up part of the collar 9. An inner thread 10 is arranged in the collar 9 in FIGS. 1 and 2, whilst an external thread 11 is provided in the collar 9 of the embodiments shown in FIGS. 3 to 10.

Figure 2:
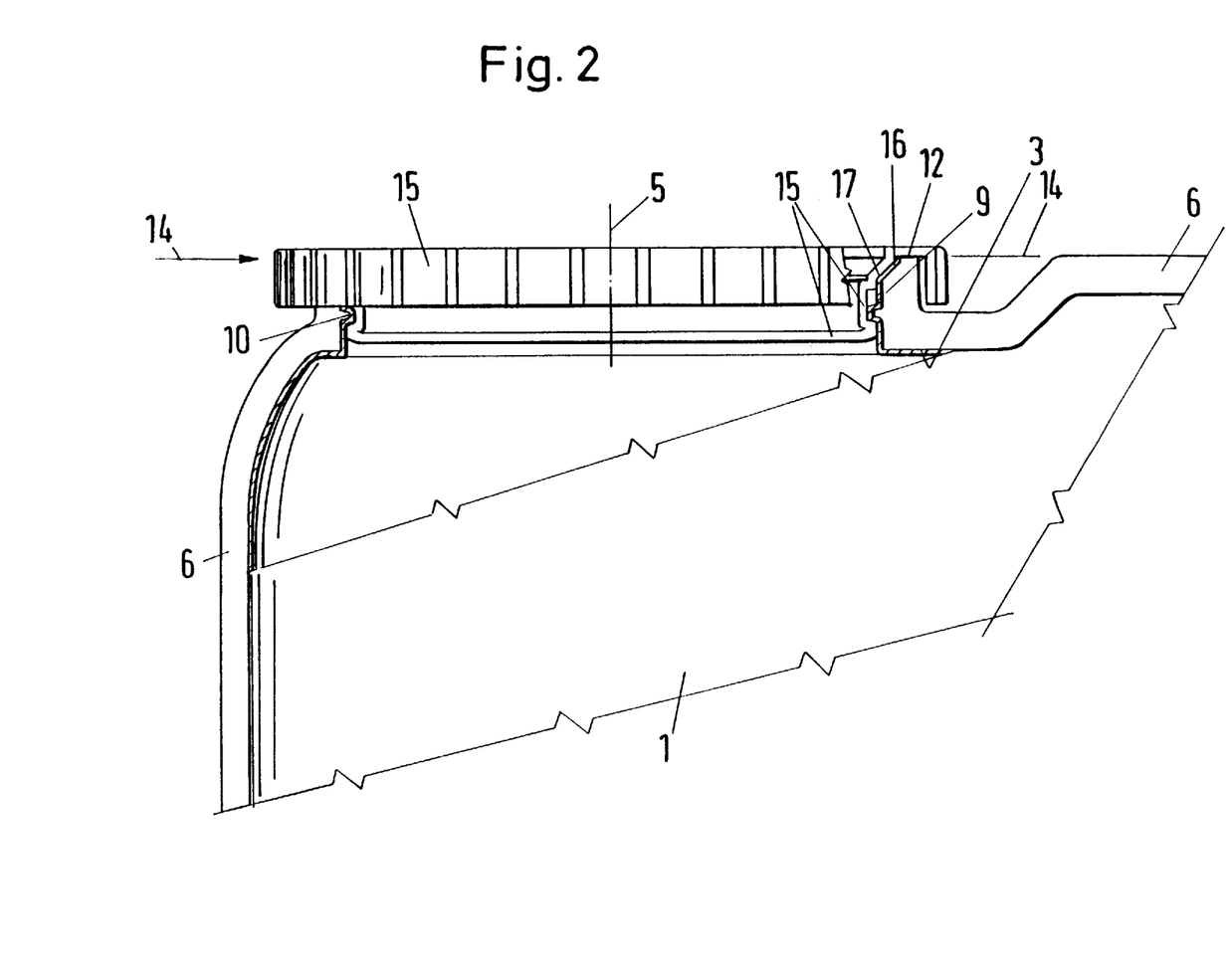
FIG. 2 is a broken away view shown partly in cross-section through the pouring opening of the pack, according to FIG. 1, which is attached by a screw top.

With the embodiment shown in FIGS. 1 and 2, the seam 6 projects on diametrally oppositely disposed sides of the collar as far as its free upper edge 12. With the embodiments shown In the other drawings, the seam 6 likewise projects as far as the free upper edge 12 of the collar 9, but in this last portion 13 it tapers towards it.

Figure 3A:
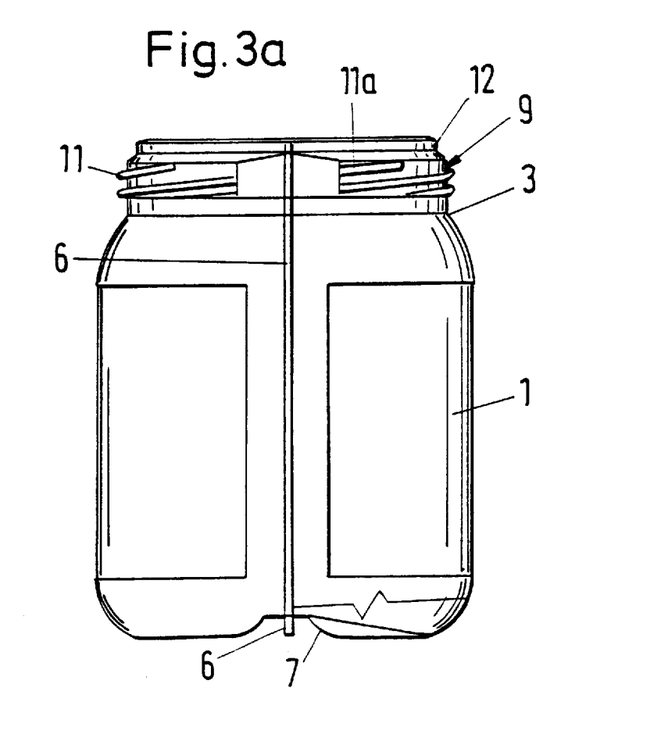
FIG. 3a is the side view of a pack which is open on one side with an outer thread.
Figure 3B:
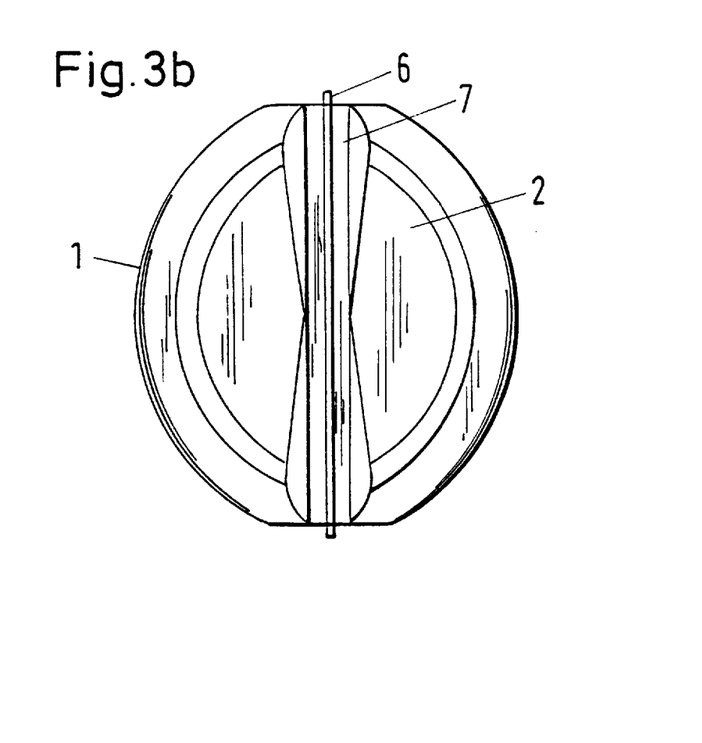
FIG. 3b is a bottom view of the pack in FIG. 3a, FIG. 4a is a side view of the pack in FIG. 3a, looking from right to left, for example.
Figure 4A:
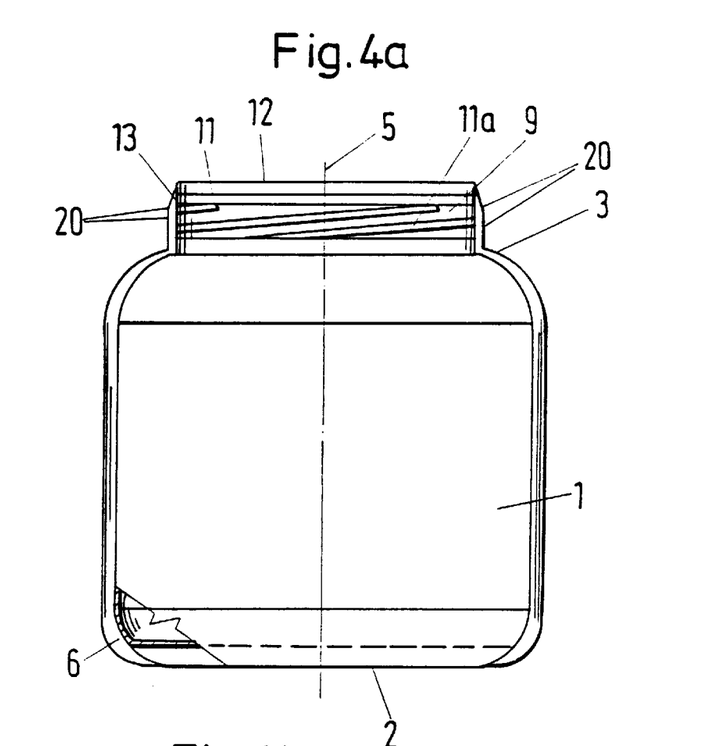
Figure 4B:
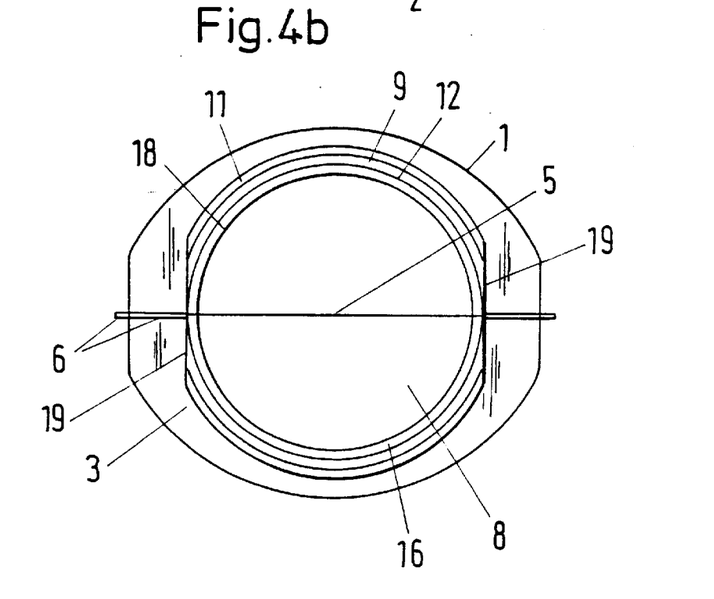
FIG. 4b is a plan view of the pack according to FIGS. 3a and 4a, showing the laterally flattened collar.
Figure 5:
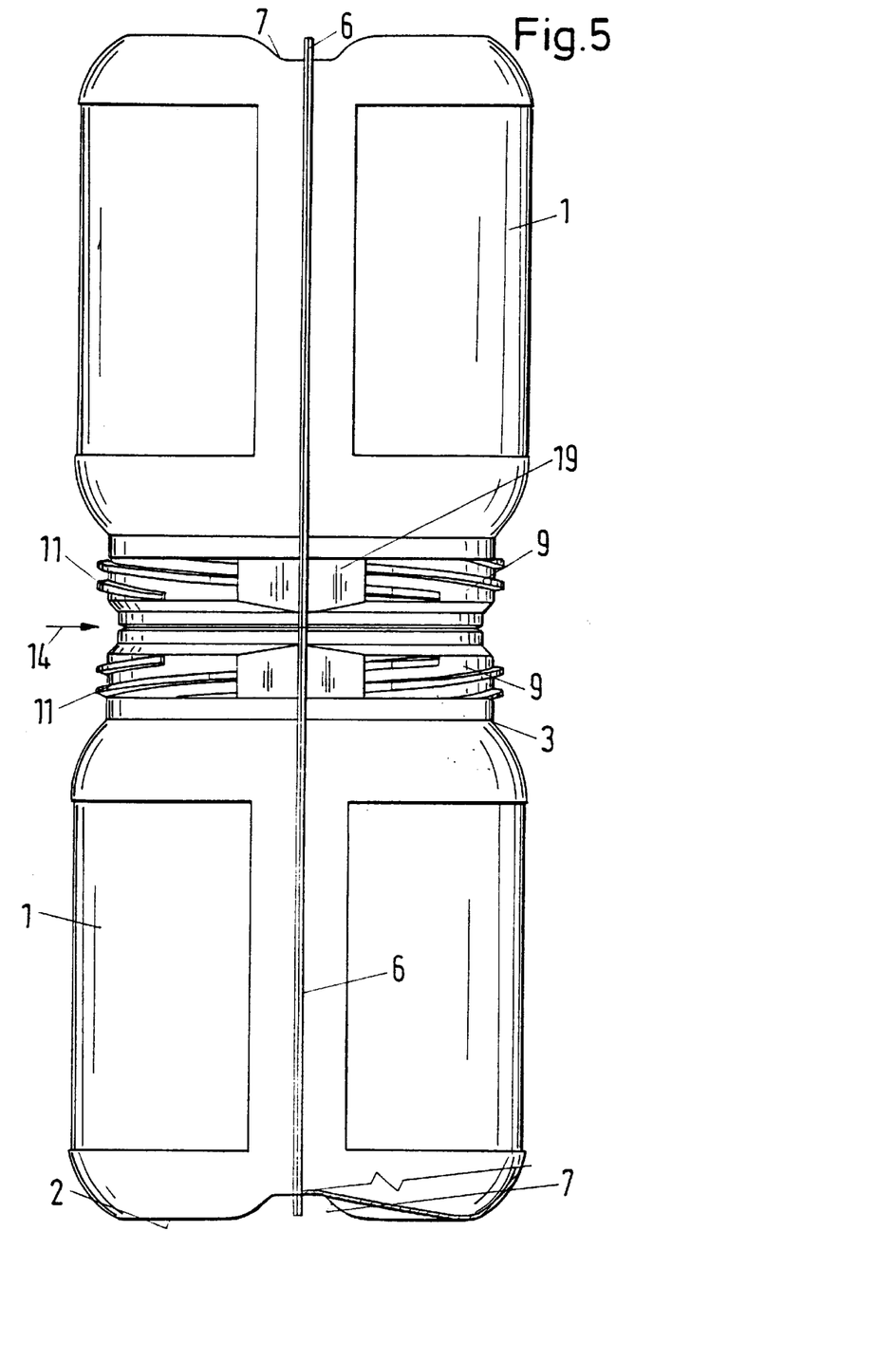
FIG. 5 is the side view or two packs which are joined together head to head, looking in the direction of the weld seam, before the body as a whole has been separated.
Figure 6:
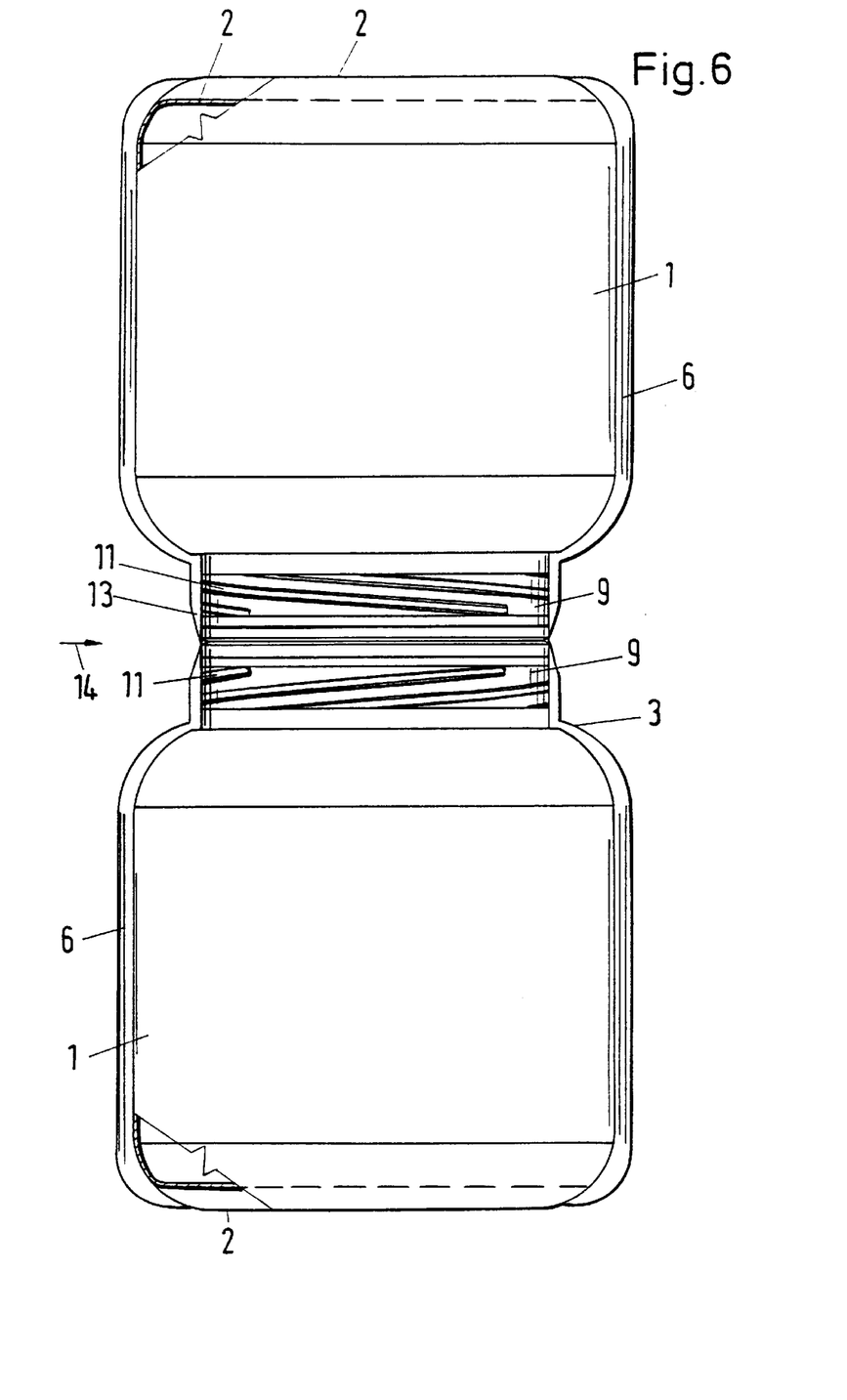
FIG. 6 is a view of the pack according to FIG. 5, looking at the side from the right onto the pack, for example, vertically onto the plane of the weld seam.

In FIG. 5 it can be seen that the seam 6 is actually formed from two edge flanges of the pair of mould halves, for these edge flanges are welded together at the seam, and for this reason the seam 6 is also termed the weld seam. In FIG. 5 it is also possible to see the outwardly substantially closed unit of the two packs which are joined together head to head by way of the collars 9, these packs being formed from the left-hand side pair or mould halves and the right-hand side pair of mould halves. The separation is made along the line shown in FIG. 5 along the arrow 14. The separation divides the "pairs", so that the individual packs then result, as shown in FIGS. 1 and 3 and 4. With the first embodiment shown in FIGS. 1 and 2 with the inner thread 10, the dividing line 14 is disposed in the top edge of the seam 6 at the top 3, and in the free upper edge 12 of the collar 9. As a result, the collar 9 is composed of two collar halve s which are not marked in particular.

A screw top 15 which is only shown in FIG. 2 is used to close the pouring opening 8. It has an appropriate inner thread for the embodiment according to FIGS. 1 and 2; and an outer thread for the other embodiments of the pack.

FIG. 2 shows the screw top which is of a U-shaped cross section at the periphery, the "U" shape of which is downwardly open at the top 3. To the right of the top 15 this latter is broken away in FIG. 2, and is shown in cross-section. Here, it is also possible to see that the upper free edge 12 of the collar 9 is frustoconical and has an annular sealing face 16 which is oppositely disposed to a corresponding sealing face in the top 15. A sealing mass 17 is fixed thereto which presses onto the sealing face 16 of the collar 9 when the top is screwed on. With the embodiment according to FIGS. 1 and 2 it is possible to see that in cross-section the line of the frustoconical sealing face 16 is disposed at 45° relative to the longitudinal centre line 5.

The top 15 which has a screwthread corresponding to the inner thread 10, on the one hand, or to the outer screwthread 11, on the other hand, of the collar 9, is structured in an obvious way, and so the screwthread in the screw top 15 is not marked in greater detail. The profiling of the seam 6 in the region of the collar 9 for creating a companion thread for the thread of the screw top is not shown in detail with these embodiments, but is evident in per se known manner.

If the second embodiment in FIG. 3, and following, is studied more closely, then adjacent to the sealing opening 8 it is possible to see the circular sealing face 16 on the outer free edge 12 of the collar 9, which extends from that edge 12 to the centre of the opening 8. This sealing face 16 can be seen clearly in FIG. 4b, for example.

FIG. 4b is the plan view of the pack with the outer thread 11. A view is taken along the longitudinal centre axis 5 which appears as a point In the centre in FIG. 4b. The pouring opening 8 is formed by the innermost circle 18 which represents an almost sharp edge 18, tapering in a wedge shape, of the annular sealing face 16. The sealing surface 16 thus extends radially from the sharp edge 18 (from the centre 5 outwardly) as far as the second circle 12 which represents the upper edge 12 of the collar 9.

In FIG. 4b it is also possible to see that the collar 9 is flattened in the region of the seam 6 on diametrally oppositely disposed sides, inwardly. i.e. toward the centre 5 in such a way that on either side in the region of the seam 6 a flat collar portion 19 is produced without a screwthread on either side of the seam 6. From FIG. 4a it can also be seen that the outer edge, denoted by the reference numeral 20, of the seam 6 does not project in the region of the collar 9 over the main profile of the collar 9 which is circular. If, according to FIG. 4b, a view is taken onto the collar 9, then it is possible to imagine its base profile as a continuation of the outer circle with the outer thread 11.

When a screw cap an a collar 9, designed in this way, of a pack such as that In FIG. 3 and 4 is screwed on, the screwthread of the screw top 15 also embraces the seam 6 in the region of the collar 9 since this collar is reduced in height such that the outer edge 20 can be embraced by the screw top, without any harm, in the afore-described way. As a variant, the outer edge 20 could also be profiled accordingly, so chat a type of continuation of the outer thread 11 results, and the screw top is also supported in the region of the outer thread 11 on the correspondingly profiled outer edge 20 (not shown) of the seam 6.

In the embodiments shown here, the screwthreads 10 and 11 are screwthreads with four threads, and the four screwthread sections 10a, 11a can be se en which extend over more than 90° over the periphery, and as a result overlap each other.

Figure 7:
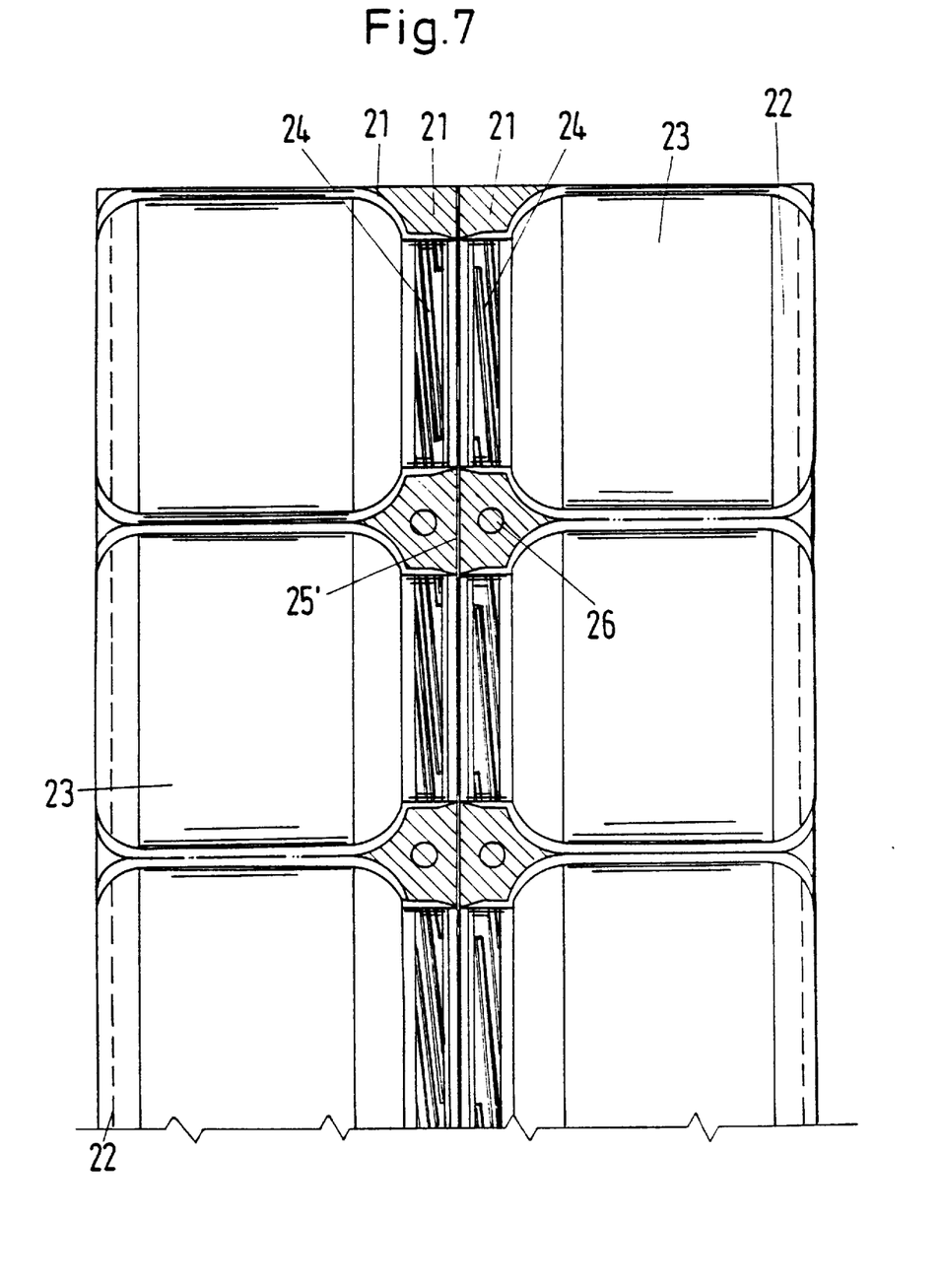
FIG. 7 is a plan view of the deep-drawing device, cut away at the bottom, wherein three pairs or mould half shells can be seen with mould halves which are of a mirror-image design, and the collar parts are placed on each other, and are provided for outer threads.
Figure 8:
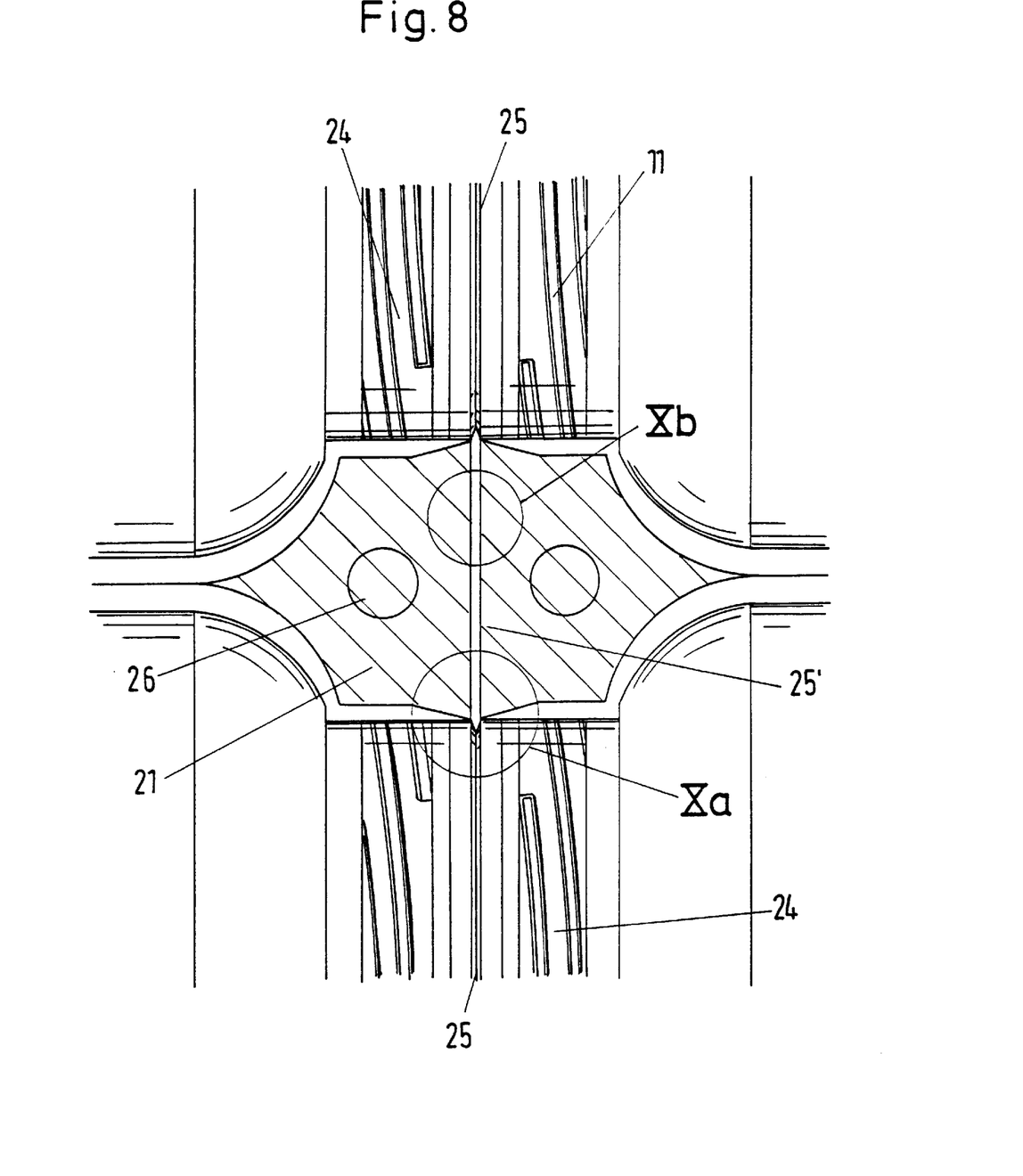
FIG. 8 is a part view, on a larger scale, of the tool shown in FIG. 7, wherein the region between two pairs of mould halves is shown between four collars.
Figure 9:
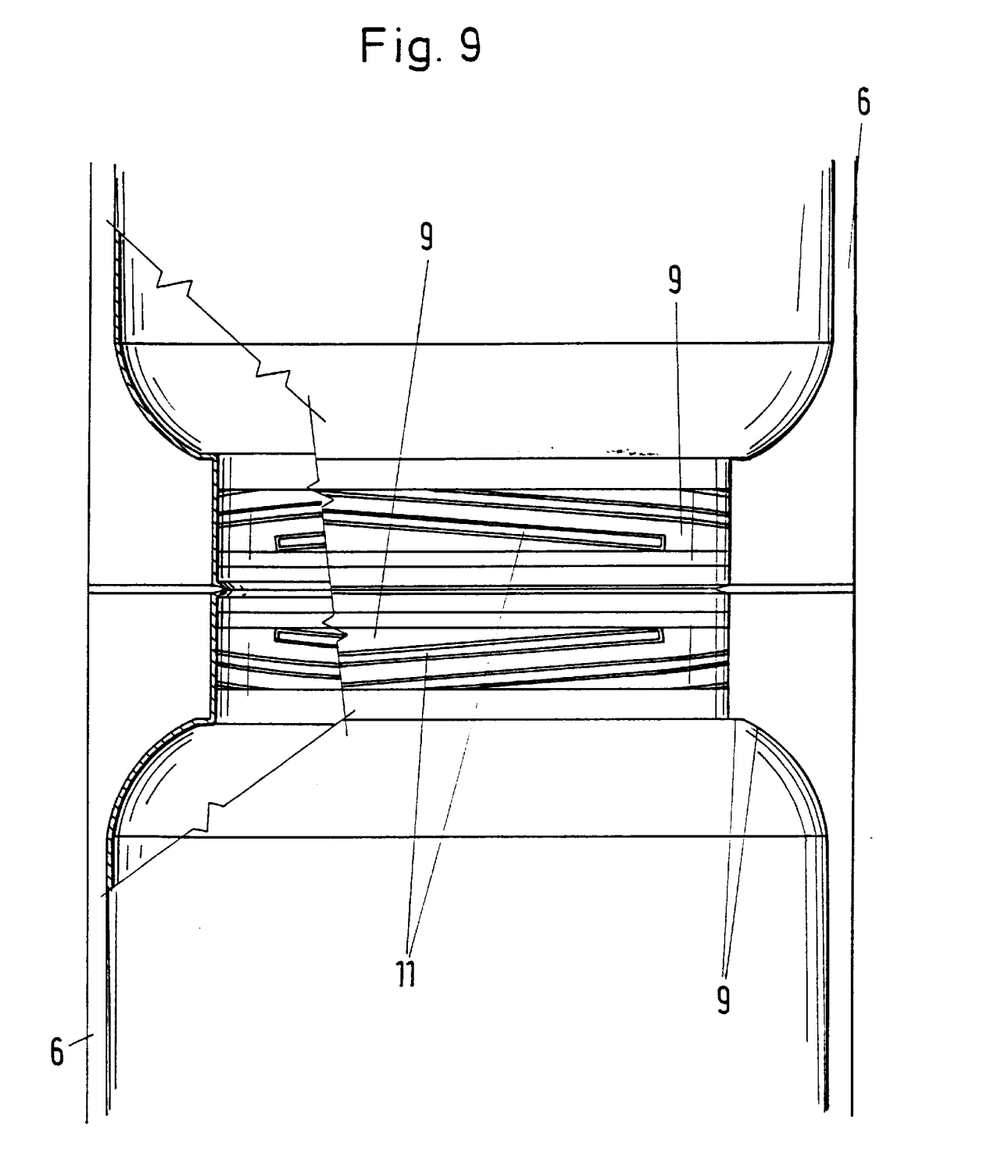
FIG. 9 is a broken away side view, cut open to the left, of the joined pack unit, before it is separated, on a larger scale.
Figure 10A:
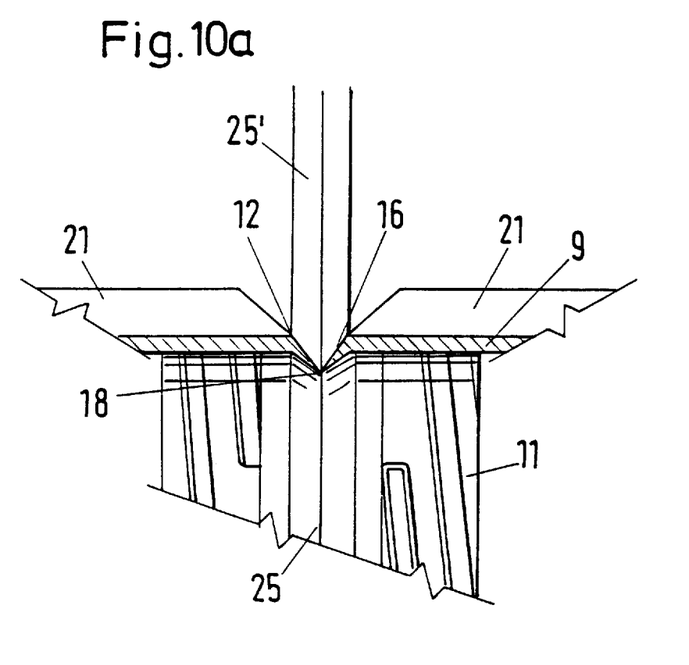
FIG. 10a is a detail, on a larger scale and broken away, according to the bottom circle Xa, marked by broken lines, in FIG. 8.
Figure 10B:
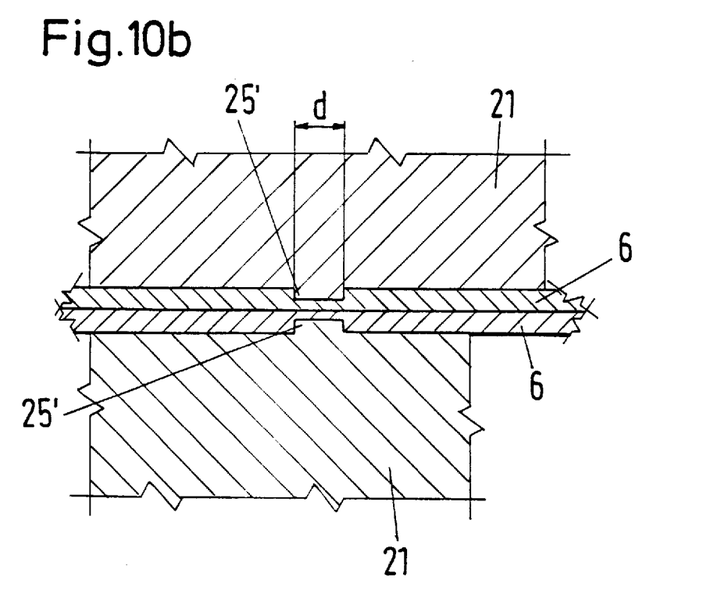
FIG. 10b is also a drawing which is broken off and on a larger scale of a detail according to the circle Xb, marked by a broken line, in FIG. 8.

The device for manufacturing the pack described can be seen in FIGS. 7, 8 and 10. Therein, it should be noted that FIGS. 8 and 10 show details from FIG. 7 on a large scale. In FIG. 7, a view is taken of three pairs of mould halves, the bottom pair of which Is broken away. Since each complete mould half is composed of two mould halves 23, and each complete mould half is structured so that it is basically the same, a description is given here of only one complete mould half, for the features will be the same for the other half. Each complete mould half is thus formed from two mould halves 23 which are of mirror-image design and which are arranged with each of their collar portions 24 in relative positions such that the mould halves 23 on the collar portions 24 are in opposite relationship. Therefore, both mould halves 23 are joined by a common, raised edge 25. This is shown more clearly in FIGS. 8 and 10. On the outside, the mould halves 23 which form a unit are joined by an edge portion 21 which is disposed substantially in one plane and which embraces the outside of the cavity and closes it. In the region of the right-hand and left-hand edge which extend from the top to the bottom in FIG. 7, the respective edge portion 21 is covered by an edge moulding tool 22 in two parts which has to be movable to facilitate removal from the mould. According to FIG. 3a or FIG. 5, the seam 6 must extend in the recess 7, and fir this reason the tools 22 must be designed in two parts and be movable to permit removal from the mould.

In FIG. 7 it can be seen that the two mutually oppositely disposed mould halves 23 which are of mirror-image configuration to each other, such as a conventional deep-drawing tool, are embraced and closed by the flat edge portion 21. The collar portions 24 are disposed, on the other hand, in the central region, and therefore can be structured into the end shape properly, as desired, e.g. provided with an inner thread 10 or an outer thread 11.

Adjacent to the collar portions 24 are edge portions 21 with ejection means 26 which are used to facilitate removal from the mould after the deep-drawing operation. In the region of the edge portion 21, between two ejection means 26, there is a groove 25' which is about 1 mm in width and which extends the raised edge 25 of V-shaped cross-section between two collars 24 in the form of a continuous prolongation, so to speak. This raised groove 25' is common to the two mould halves 23.

In FIG. 8 it is possible to see, in the upper region, two juxtaposed collar portions 24, the edge portions 21 with the ejection means 26 and then two collar portions 24. The common dividing line from the top to the bottom is raised and is composed of the V-shaped edge 25 at the top and at the bottom, between the collar portions 24, and the groove 25' between them.

FIG. 10b shows a view on a large scale of the circle Xb, marked by broken lines, in FIG. 8, but in addition, to aid comprehension there are pack walls, that is to say with seams 6 between the one edge portion 21 of one mould half on one side of the machine and another edge portion 21 of a mould half on the other side of the machine. Each edge portion 21 has the groove 25' in the centre which projects towards the material, i.e. the seem 6 of the pack. The width is characterised by the two broken lines and the arrow is characterised by the letter, "d". With this embodiment it is 1 mm. This will shown the extent to which FIG. 10b is exaggerated. This is to facilitate understanding of it.

In FIG. 8, the circle Xa shown by broken lines marks the position of the tool where the collar portion 24 ends outwardly, wherein the sealing face 16 can clearly be seen next to the free upper edge 12 of the collar 9 (product, workpiece). The two mutually oppositely disposed collars 9 are broken away in FIG. 10a and are marked by broken lines, wherein it is possible to see their sharp edge 18 which tapers in a wedge-shape and which—taken onto the worktool extends along the common raised edge 25. There, as in FIG. 10a. the edge 18 appears as a connection point, and the raised rib 25' (top) makes a transition into the raised edge 25 (at the bottom) which is of a "V"-shaped cross-section.

It is possible to see the way in which the plastics panel can be placed over the raised edge 25 by the deep-drawing operation, and can be pulled up so that the material for forming the edge 18 at the sealing face 16 can be made thinner. Along this raised edge 25 it is possible for the worktool to be provided with the needle-like region of increased height which would appear as a small point, but which is not shown In the drawings.

What is claimed is:

1. A method for manufacturing simultaneously two packs for flowable contents from a flat deep-drawable plastic material, each pack having tubular side walls, a bottom wall and a top wall, the top wall having an open upstanding threaded collar defining a pouring opening closable by a screw-on top, and including a seam which passes around the pack in a plane which is parallel to a longitudinal center axis, the seam being arranged in the top wall in such a way that the seam is interrupted by the pouring opening and projects on diametrically oppositely disposed sides almost as far as a free, upper edge of the upstanding collar, the method comprising the steps of:

deep-drawing into a mold half the flat, deep-drawable plastic material to form at least a first and a second mold half part, each mold half part comprising two pack half-shells connected by a semi-cylindrical connecting passage, wherein said two pack half-shells in each mold half part are aligned on a common longitudinal axis and are symmetrical about a symmetry plane perpendicular to the common longitudinal axis and located at a center of the semi-cylindrical connecting passage, wherein a closed outer edge encloses the mold half to provide uniform holding forces in the mold half, and wherein deep drawing forms the semi-cylindrical connecting passage with thread portions in a central enclosed portion of the mold half where sufficient mold heat is present to accurately shape the semi-cylindrical connecting passage and thread portions, and wherein the closed outer edge forms a continuous edge flange disposed in a common plane that surrounds said two pack half-shells of each said mold half part, joining the continuous edge flange of the first mold half part to the continuous edge flange of the second mold half part so that the two pack half shells of the first mold part align with the two pack half shells of the second part to form a pair of packs having a seam formed by the joining of edge flanges of the first and the second mold half part, wherein the symmetry planes of the mold half parts coincide at a single coincident plane, and wherein the semi-cylindrical connecting passages of the joined mold half parts form a threaded cylindrical passage on each of the pair of packs, the threaded cylindrical passages being joined at respective mouth ends at the coincident plane, and separating the pair of packs at the coincident plane to form immediately thereupon the two packs, by which step the open, upstanding threaded collars having free, upper edges are formed by the separated threaded cylindrical passages.

2. A method as claimed in claim 1, wherein the step of deep drawing forms a plurality of first mold half parts and a plurality of second mold half parts.

3. A method according to claim 1, wherein an upper edge of the upstanding collar is frustoconically shaped and includes a sealing surface projecting from the upstanding collar toward an inside of each pack.

4. A method according to claim 1, wherein the step of deep drawing includes shaping the semi-cylindrical connecting passage with flat side portions at the continuous edge flange.

5. A method according to claim 1, wherein the step of deep drawing includes forming a recess in a bottom wall portion to accommodate the continuous edge flange.

6. A method according to claim 1, wherein the step of deep drawing includes shaping profiles in the continuous edge flange at the semi-cylindrical connecting passage consistent with the thread portions.

7. A method according to claim 1, wherein the step of separating the pair of packs at the coincident plane includes cutting through the central cylindrical passage.

8. A method according to claim 1, wherein the edge flanges of the first mold half part and second mold half part are joined by residual heat present in each mold half part from said deep-drawing.

9. A method according to claim 1, wherein an upper portion of said upstanding collar is frustoconically shaped and includes a sealing surface projecting outwardly from each pack.

10. A method according to claim 1, further comprises the step of smoothing the free, upper edge of the upstanding collar with a heated tool.

* * * * *